United States Patent [19]

Amberg

[11] 4,187,276
[45] Feb. 5, 1980

[54] METHOD OF MAKING A PLASTIC PACKAGE

[75] Inventor: Stephen W. Amberg, Toledo, Ohio

[73] Assignee: Owens-Illinois, Inc., Toledo, Ohio

[21] Appl. No.: 905,686

[22] Filed: May 15, 1978

Related U.S. Application Data

[63] Continuation of Ser. No. 705,868, Jul. 16, 1976, abandoned.

[51] Int. Cl.² .................................................. B29C 27/24
[52] U.S. Cl. .............................. 264/515; 156/244.13;
215/1 C; 215/12 R; 264/146; 264/230; 53/399;
53/442
[58] Field of Search ................ 156/84, 85, 86, 244.13;
53/441, 442; 215/1 C, 12 R, 246; 264/342 R;
174/DIG. 8

[56] References Cited

U.S. PATENT DOCUMENTS

| 3,002,640 | 10/1961 | Kline | 215/12 R |
|---|---|---|---|
| 3,161,999 | 12/1964 | Klusmire | 53/30 S |
| 3,372,826 | 3/1968 | Heaton | 215/1 C |
| 3,462,327 | 8/1969 | Sandler | 156/86 |
| 3,480,168 | 11/1969 | Lee | 215/1 C |
| 3,482,724 | 12/1969 | Heaton | 215/1 C |
| 3,542,229 | 11/1970 | Beyerlein et al. | 156/86 |
| 3,635,367 | 1/1972 | Morita et al. | 156/86 |
| 3,677,774 | 7/1972 | Rausing | 99/171 B |
| 3,698,586 | 10/1972 | Terner | 156/86 |
| 3,722,725 | 3/1973 | Khetani et al. | 215/12 R |
| 3,726,429 | 4/1973 | Doughty | 215/12 R |
| 3,767,496 | 10/1973 | Amberg et al. | 156/86 |
| 3,912,100 | 10/1975 | Graham et al. | 215/12 R |
| 3,927,782 | 12/1975 | Edwards | 215/12 R |
| 3,948,404 | 4/1976 | Hathaway et al. | 215/1 C |
| 3,951,292 | 4/1976 | Amberg | 156/86 |
| 3,955,020 | 5/1976 | Cavanaugh et al. | 215/12 R |
| 3,983,997 | 10/1976 | Warshaw | 53/30 S |

Primary Examiner—Caleb Weston
Attorney, Agent, or Firm—Richard D. Heberling;
Myron E. Click; David H. Wilson

[57] ABSTRACT

A package is provided comprising an uprightly unstable thermoplastic bottle having a generally convex bottom and a peripheral sidewall extending upwardly therefrom and a base directly contacting and loosely supporting the bottle in an upright position the package further comprises predecorated heat shrunk annular label means in tight unitizing peripheral engagement with externally exposed surfaces of the base and sidewall for securely and integrally attaching said bottle and said base, the means being substantially the sole means for such attachment.

6 Claims, 4 Drawing Figures

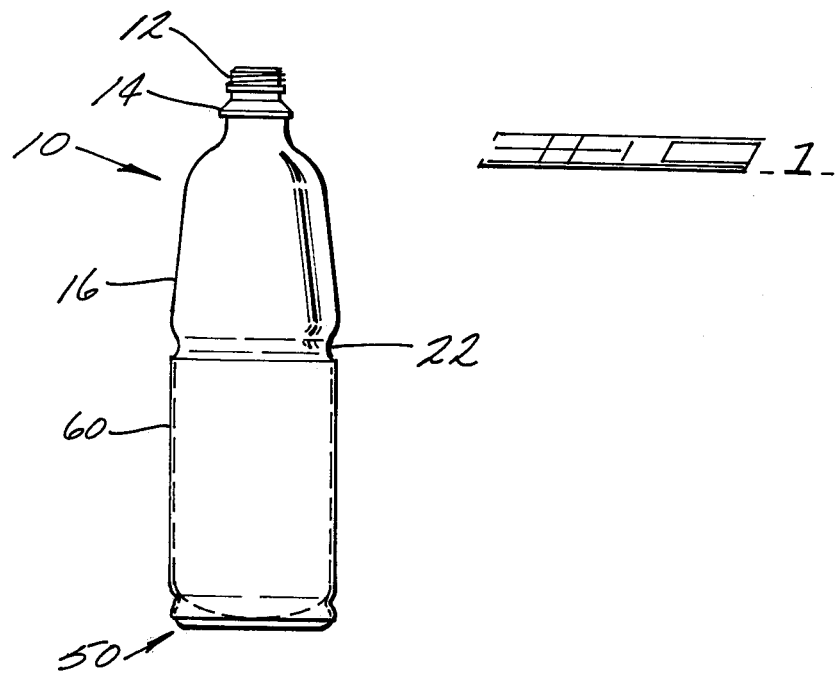
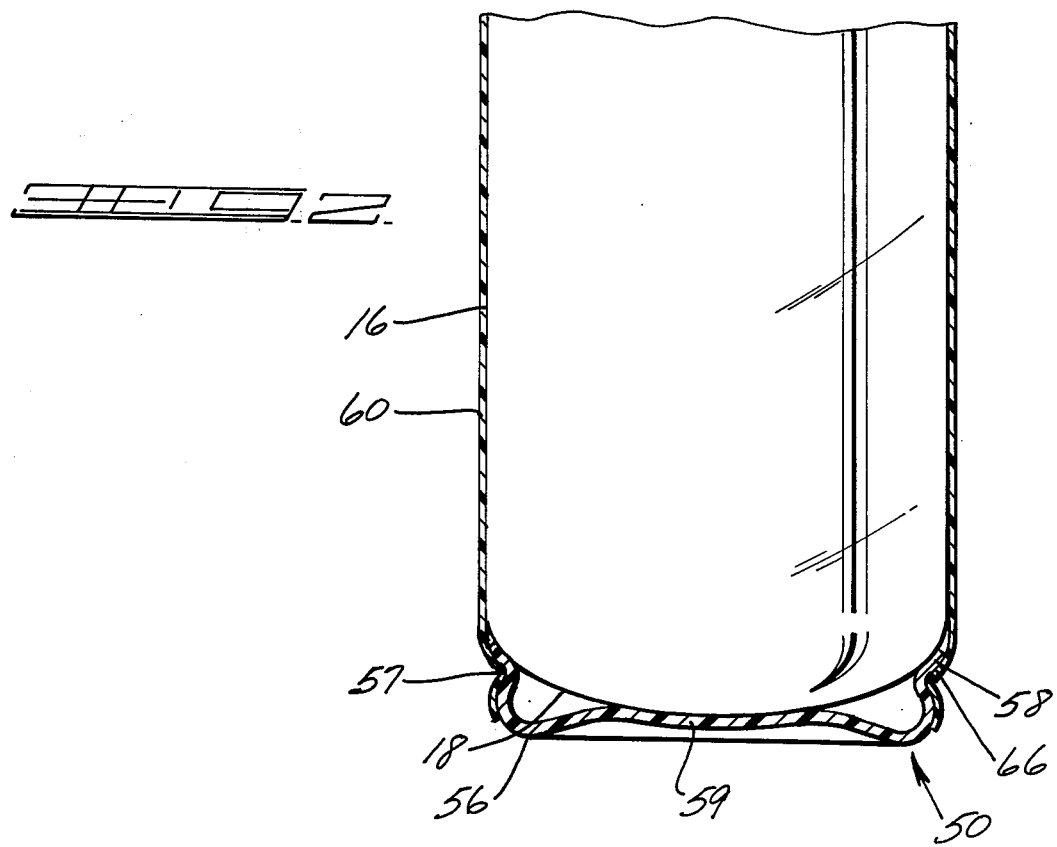

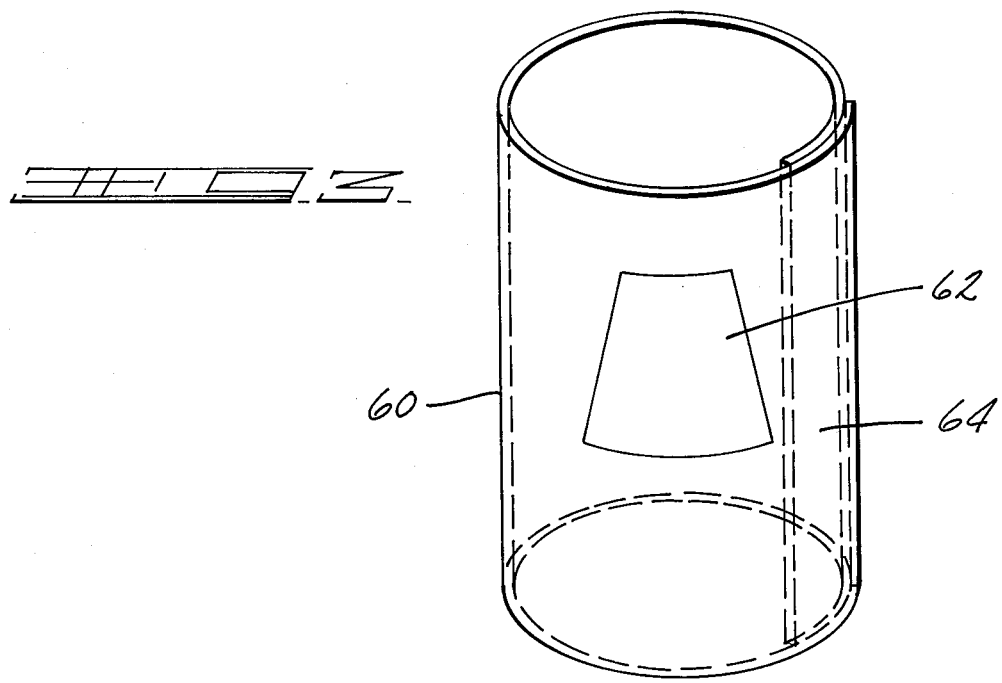
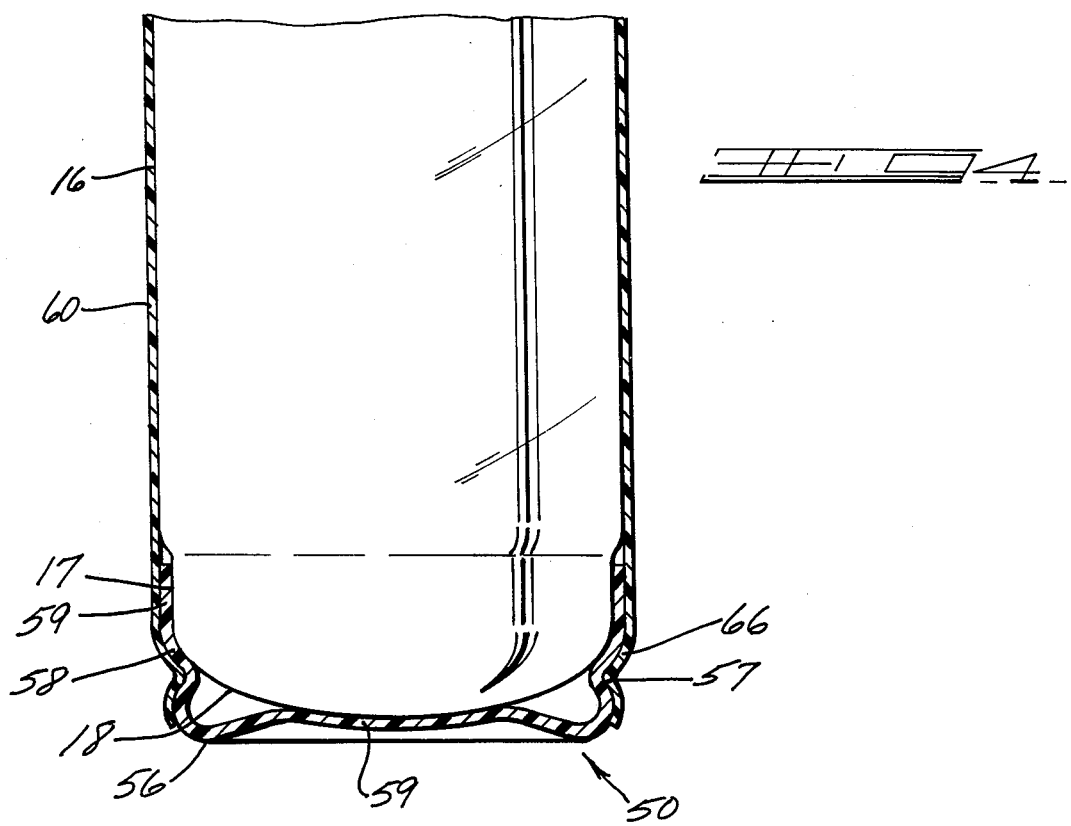

METHOD OF MAKING A PLASTIC PACKAGE

RELATED APPLICATION

This is a Continuation, of application Ser. No. 705,868 filed July 16, 1976, abandoned, and which is also related to application U.S. Ser. No. 705,867, now abandoned.

THE INVENTION

The present invention relates to composite packages for containing various products including comestibles and pressurized fluids; more particularly the invention relates to a composite package comprised of an uprightly unstable bottle having a separate support base or cup with the bottle and base being attached by means of a heat shrunk predecorated sleeve.

Biaxially oriented thermoplastic bottles are receiving much attention as candidates to replace glass bottles presently being used to contain carbonated soft drinks, beer, aerosols and the like. The thermoplastics from which these bottles are made and which are receiving most wide acceptance are the polyesters, for example polyesters comprised of the polymeric reaction product of ethylene glycol (including its esters), and terephthalate acid (including its esters), as well as the so-called high nitrile polymers. The latter polymers are generally referred to in the trade as Lopac or Barex materials. In order to increase the strength quality of such bottles and to maximize production efficiencies and, from an overall point of view, to make these bottles more economically competitive with glass it has been found necessary to form such bottles with a convex bottom portion. Obviously this convex bottom portion creates an unstable bottle and hence there is a need to support the bottle and, in that respect, various types of support bases are integrally and securely attached to the bottle. Exemplary of such bottles with their support bases are those set forth in U.S. Pat. Nos. 3,722,725, 3,948,404, 3,726,429 and 3,927,782. Another such support base which is securely attached to these bottles is that set forth in U.S. Pat. No. 4,082,200. As will be appreciated from these patents, and the above-referred to application, extensive capital investment is required to provide for an appropriate commercial assembly device whereby the bases are secured to the bottles. This, plus the direct cost in assembling the base to the bottle is reflected in increased prices to the ultimate consumer which adversely affects the competitiveness of such packages with glass. Additionally in packages of the type described above in spite of precautions and efforts to solve the problem a situation arises wherein the area, or volume, between the internal surface of base and the external surface of the bottle is infestation prone. That is in spite of attempts to provide for a tight reliable seal of the base to the bottle to preclude infestation it has not been commercially and economically possible to reliably do this and hence dirt, liquids, such as for example syrups, water, warehouse insects, and the like gain entry into the above-referred to zone and cause the occurrence of mould and even the formation of obnoxious odors; this, obviously, is unsatisfactory. Additionally because of such seepage or entry into the zone washing of the containers is not suitably practiced since it simply enhances the problem or else drain holes must be provided in the base; the latter approach, while solving one problem, only creates another.

In the above-referred related application, namely application U.S. Ser. No. 705,867, the problem of infestation is focused upon and is solved by employing a heat shrunk annular pre-decorated sleeve label to preclude entrant of contaminants between the base and the bottle. Unfortunately, however, while that related application has many benefits it is still subject to the problem that in the mass production of such packages the step must still be practiced wherein the base is securely attached to the bottle prior to positioning a heat shrinkable pre-decorated sleeve label about the bottle and base which sleeve label is then heated to bring it into heat shrunk engagement with the bottle and base. In order, of course, to provide for the secure attachment of the base to the bottle those respective members are provided with complex configurations to provide for the inter-engagement of elements of these two members which will result in the secure attachment. This of course requires complex mold designs which in turn adversely affects costs of manufacturing and the ability of such packages to economically compete with glass. That is the molds which are employed to form the bottles are expensive because of the configuration which must be provided to the bottle; likewise injection molding techniques have been employed to produce the supporting base since this base typically requires a configuration which is most suitably formed by such injection molding techniques. The latter of course has its economic and competitive deficiencies.

In accordance with the present invention an improvement is provided which will allow the packages of the general type referred to above to be produced at much lower costs and thereby to be more economically competitive with glass. Such packages are supplied with a pre-decorated label and hence the additional step of providing a label on the bottle, typically done by the bottler, in not necessary, hence also reducing cost and, furthermore, the above-referred to infestation problem will not exist. The above advantages are attained by employing a heat shrinkable pre-decorated annular label of the type set forth in related application U.S. Ser. No. 705,867 as substantially the sole means for attaching the base and the bottle. That is, the bottle and base elements of the assembly are now so designed so that the base loosely supports the bottle and then the heat shrinkable pre-decorated sleeve is employed as substantially the sole means to secure the base to the bottle in a unitized fashion. This approach allows for molds to be employed for the bottle which are produced much more cheaply because the complex configurations of the prior art are not needed to provide for secure inter-engagement of the bottle with the base. Similarly, the base portions can be more cheaply manufactured for example by simpler, cheaper forming techniques like vacuum forming a sheet because they are of a simpler configuration inasmuch as they no longer need be provided with complex configurations for inter-engagement with the configuration of the bottles to provide for the secure attachment.

In accordance with the present invention and unlike the prior art referred to above the bottle supporting base and a thermoplastic bottle which is uprightly unstable need only be so configured that the base loosely supports the bottle in an upright position and there is no need, discounting the heat shrunk pre-decorated label, to provide for the secure attachment of the base to the bottle; in this way less complex assembly machinery is needed since all that is required is that the base loosely support the bottle in an uprightly stable position; this in turn will allow for more expedient and cheaper production.

As will be apparent by reference to the above patents and pending applications, the supporting base and bottle are in secure telescopic coaxial relationship and once assembled the axis of the bottle cannot be conveniently inclined with respect to the axis of the base nor is the base easily separated from the bottle. In short they are designed to be securely attached so as to withstand the rigor of commercial acceptance e.g., being able to pass through a bottler's plant and being used by consumers. Thus as contemplated herein when reference is made to the bottle being loosely supported by, or loosely positioned upon, a base, or that the base loosely supports the bottle, or the like, there is contemplated situations wherein, unlike the above, the axis of the bottle can be easily inclined with respect to the axis of the base or, and again unlike the above-referred to patents, and applications, the base and the bottle can be easily separated by relative axial movement of those members and, but for and discounting the sleeve label, the base and bottle per se cannot withstand the rigor of commercial acceptance.

U.S. Pat. No. 3,482,724, and its parent application U.S. Pat. No. 3,372,826, discloses a glass container having a convex bottom and a base therefor which base may be applied by heat shrinking.

U.S. Pat. No. 3,002,640 discloses a foamed polystyrene sleeve, which may have a printing thereon, about fragile articles such as, for example, glass or eggs. The sleeve is applied by slipping over the article, or by stretching it over to provide a snug fit, or by heating to expand the thickness.

U.S. Pat. No. 3,542,229 discloses the application of a shrunk-on band, which may include a decoration, of a stretchable heat shrinkable film material, for example polyvinyl chloride film, onto a thermoplastic bottle; the ends of the band may be joined by gluing, sealing, or welding.

U.S. Pat. No. 3,677,774 is directed to the formation of a multi-pack of plural bottles, for example polyvinyl chloride bottles, which have a sleeve and which pack of plural bottles are in a heat sealed envelope; the envelope contacts only part of the respective containers, i.e. the envelope does not peripherally contact the bottle and/or sleeve, and contains pressurized carbon dioxide.

U.S. Pat. No. 3,462,327 discloses an uprightly stable bottle, a foamed polystyrene receptacle member encircling the bottle, a shrunk-on skin of vinyl, which can be seamed, surrounds the receptacle member, and a base which is welded to the shrunk-on skin.

U.S. Pat. No. 3,955,020 discloses a self supporting, uprightly stable glass container having a plastic film and what is called a film cup placed over the heel of the container. U.S. Pat. No. 3,912,100 discloses an uprightly stable glass bottle having a bottom film covering and a heat shrunk sleeve contacting the film and glass surface. U.S. Pat. No. 3,698,586 discloses an uprightly stable glass container having a heat shrunk cup on its bottom and a plastic film, which may be a heat shrinkable plastic sleeve, covering the glass container above the cup.

As will be readily apparent, none of the foregoing patents describe the present invention and represent only isolated disclosures which are not directed to solving the problem solved by applicant nor to satisfying the need satisfied by applicant.

Thus, in accordance with this invention there is provided a package comprising an uprightly unstable thermoplastic bottle having a generally convex bottom and a peripheral sidewall extending upwardly therefrom, a preformed base directly contacting and loosely supporting said bottle in an upright position, and pre-decorated, heat shrunk, annular label means in tight unitizing peripheral engagement with externally exposed side surfaces of said base and sidewall for securely and integrally attaching said bottle and base, said means being substantially the sole means for such attachment.

In accordance with a preferred embodiment of this invention the preformed base which loosely supports the uprightly unstable bottle includes a peripheral package support surface and a generally tubular sidewall proceeding upwardly therefrom with the sidewall including a peripheral outwardly and upwardly extending ledge portion and wherein a portion of the label means extends inwardly and downwardly in heat shrunk tight contact with the ledge.

In accordance with another preferred embodiment of this invention the peripheral sidewall of the uprightly unstable bottle, adjacent the bottom, includes an inwardly offset sidewall portion and a portion of the tubular peripheral sidewall on the base is in telescopic contact with a portion of that inwardly offset sidewall portion.

The present invention will be more apparent by reference to the drawings wherein:

FIG. 1 is a side elevation view illustrating the present invention;

FIG. 2 is a partial sectional view more clearly showing the bottom portion of a package in accordance with the present invention;

FIG. 3 illustrates the sleeve label used in accordance with this invention; and

FIG. 4 is a view similar to FIG. 2 illustrating an alternate embodiment of this invention.

Initially, in accordance with this invention, there is provided a heat shrinkable organic polymeric pre-decorated sleeve label with the label having a high heat shrinkage in the circumferential direction of the sleeve and a low heat shrinkage in the axial direction of the sleeve. The sleeve is of sufficient axial length so that upon being heat shrunk it is brought into snug encircling engagement with the external surfaces of the bottle and of the base and spans the upper terminus of the base to seal any opening between the bottle and the base immediately adjacent the upper terminus of the base. Preferably the sleeve label comprises a heat shrinkable closed cellular thermoplastic organic polymer.

Exemplary of suitable polymers are the polyolefins, like polyethylene and polypropylene, and copolymers of ethylene with alpha-beta monoethylenically unsaturated carboxylic acids, e.g. acrylic or methacrylic acid, or their alkyl esters, e.g. those containing 1–3 carbon atoms in the alkyl group like ethyl acrylate or copolymers of ethylene with vinyl esters, like vinyl acetate. In the foregoing the olefin moiety will be vastly predominant, i.e., in excess of about 60% by weight, desirably in excess of 70% and preferably in excess of about 80 or 90%. Exemplary of other sleeve labels as contemplated herein are those cellular/non-cellular composite laminates as set forth in co-pending applications U.S. Ser. Nos. 504,111, now Pat. No. 4,038,446 and 557,789, now def. publication D 242,950 (filed by Roger R. Rhoads) and U.S. Ser. Nos. 505,646, abandoned and 555,507, U.S. Pat. No. 3,979,000 (filed by James A. Karabedian)

all of which are hereby incorporated by reference. Extremely outstanding results are obtained wherein the sleeve label comprises a closed cellular polystyrene, for example crystalline general purpose polystyrene having a weight average molecular weight on the order of about 100,000 to about 320,000 and with the label having a thickness of about 0.005 to about 0.040 inches and a density of about .6 to about 40 pounds per cubic foot. Outstanding results are obtained by employing such a closed cellular polystyrene sheet and producing the heat shrinkable sleeve in accordance with the teachings of U.S. Pat. No. 3,767,496 which is hereby incorporated by reference. In accordance with the procedure of that patent a cellular tubular member is extruded from a circular die and is inflated as it issues from the die-head to provide for a cross, or transverse, stretching and orientation of the material and the inflated tubular member is likewise stretched or drawn in the machine direction of extrusion to provide a machine direction orientation with both of these orientations being set by air cooling of the tubular member. The stretching and cooling produces an orientation which, in turn, results in the capability of the material to heat shrink when subsequently exposed to heat. The machine direction of heat shrinkage is high and the cross direction heat shrinkage will be low, i.e., the ratio of the heat shrinkage in the machine direction to the heat shrinkage in the cross direction will be greater than 1 and, preferably, greater than 2:1 with quite desirable values being that the machine direction of heat shrinkage is in excess of about 60% and the cross direction of heat shrinkage is less than about 30%. Outstanding results are obtained by sufficient stretching to obtain a heat shrinkage in the machine direction of greater than 65% and a heat shrinkage in the cross direction of less than about 20%. The inflated tubular heat shrinkable material is then slit and trimmed to obtain a sheet of roll stock which sheet of roll stock is decorated so that the decoration reads properly in the machine direction of extrusion. The decorated sheet is then, in turn, cut into smaller rectilinear sheets and then formed into a sleeve type pre-decorated label by wrapping these sheets, on a mandrel, with the machine direction of extrusion corresponding to the circumferential direction of the sleeve to be formed and the cross direction of extrusion corresponding to the axial direction of the to be formed sleeve, and then bringing opposed ends together and joining them to form a sleeve with an axial seam therealong. Preferably the opposed ends are brought into overlapped relationship and heat sealed to provide for a pre-decorated sleeve label with an overlapped axially heat sealed seam. While thus far it has not been necessary to do so, in employing a heat shrinkable pre-decorated sleeve label comprising a closed cellular foamed polystyrene as described above and employing a biaxially oriented thermoplastic bottle of an ethylene glycol (including its esters)-terephthalic acid (including its esters) reaction product, depending on the specific application and materials employed it may be desirable to include pleats in the sleeve which run parallel to the axial seam. These pleats may be formed in accordance with the teachings set forth in U.S. Pat. No. 3,951,292 which is directed to a pilfer-proof, heat shrunk neckband for a glass container and closure.

Referring now more particularly to the drawings it will be seen that essentially the packages contemplated herein include an uprightly unstable thermoplastic bottle generally designated 10, a preformed base 50 directly contacting and loosely supporting the bottle in an upright position, a predecorated heat shurnk annular label means, or sleeve 60, in tight unitizing heat shrunk peripheral engagement with externally exposed side, or lateral, surfaces of the base and bottle for securely and integrally attaching bottle 10 and base 50, with the pre-decorated heat shrunk annular sleeve label 60 being substantially the sole means for the secure attachment of base 50 to bottle 10. As illustrated in FIG. 1 and FIG. 2, bottle 10 includes a peripheral sidewall 16 which merges with a convex bottom 18 and peripheral sidewall 16 includes, somewhat centrally located thereon, a peripheral gripping groove 22 and at its upper margin a neck, or finish, portion 12 and disposed immediately below finish 12 a neck support ledge 14. Preferably bottle 10 will be a biaxially oriented poly(ethylene terephthalate) bottle.

Preformed base 50 which loosely supports bottle 10 is formed from a material having sufficient rigidity and strength to support the bottle uprightly in the completed package form. This base may be formed by vacuum forming techniques from a sheet of a suitable organic polymer, preferably a thermoplastic polymer, with an especially suitable material being high density polyethylene. A suitable thickness for base 50 will be a thickness of about 0.025 inch. Base 50 includes a package support surface 56 and a generally tubular peripheral sidewall proceeding upwardly therefrom. The generally tubular peripheral sidewall of base 50 includes a peripheral reentrant portion 57 which is partially defined by a peripheral upwardly and outwardly extending ledge 58. Base 50 is provided with a central portion 59 which merges with the package support surface 56. As seen in FIG. 2, in a preferred embodiment, convex bottom 18 of bottle 10 is supported on central portion 59 of base 50 and the internal surface of the upwardly and outwardly extending ledge 58 also supports bottle 10. Thus as will be appreciated from FIG. 2 bottle 10 and base 50 are brought into axial alignment with the base 50 loosely supporting bottle 10.

In order to unitize base 50 and bottle 10 and to securely attach these elements there is then employed a heat shrinkable pre-decorated sleeve or label generally designated 60 as more clearly seen in FIG. 3. This sleeve is formed in the manner previously described and includes a decoration 62 thereon and an axial seam 64, preferably a heat sealed overlapped seam. Decoration 62 in the usual embodiment will either be continuous about sleeve 60 over 360°; or it will be of a repeating pattern about the circumference of the sleeve. For convenience decoration 62 is not illustrated in the other figures but it will of course be apparent that such decoration will be present. Generally, it will be preferred to produce the pre-decorated heat shrinkable sleeve in a slightly elliptical configuration such that the minor axis thereof will be sufficiently small so that as it is positioned about bottle 10 and base 50 to encircle externally disposed surfaces of bottle 10 and base 50 the sleeve will be held thereon by frictional engagement until such time as the package is subjected to heat at a temperature and for a time sufficient to bring the heat shrinkable pre-decorated sleeve label into heat shrunk snug engagement with externally exposed surfaces of bottle 10 and base 50. The axial height of sleeve 60 will usually be so selected that, upon shrinkage, its upper terminus will be located in the lower two thirds of the axial height of the package and usually its lower terminus will be disposed slightly upwardly of the package support surface 56 of base 50. Additionally, usually the axial height of base 50 will be so selected that its upper terminus will generally be in the lower ⅓ of the axial height of the package. Thus, after the bottle 10 and base 50 have been encircled within the sleeve label, base 50 and bottle 10 are securely and integrally attached by heat shrinking the sleeve to bring into peripheral engagement with lateral surface portions of base 50 adjacent its upper terminus. Usually this is done by chucking the bottle by its neck and rotating it and applying hot air to heat shrinkable sleeve label 60. While the heating cycle, i.e., the temperature and time, will vary with various materials, caution should be exercised when employing a biaxially oriented thermoplastic bottle so that the heating is insufficient to cause any substantial deformation of the bottle. As an example, when employing a biaxially oriented poly(ethylene terephthalate) bottle 10 and a sleeve which has been formed in the manner described above from a closed cellular crystalline general purpose polystyrene having a density of about 14 pounds per cubic foot and a thickness of about 0.015 inches with a heat shrinkage in the circumferential direction of the sleeve of about 70% and an axial heat shrinkage of about 10%, temperatures on the order of about 350° F. for about 6 seconds are quite suitable to obtain outstanding results.

As will be seen from FIG. 2, and generally in FIG. 1, upon being heat shrunk, sleeve 60 is brought into peripheral, snug, non-welded, non-melted, non-adhesively secured heat-shrunk engagement with externally exposed surfaces of peripheral sidewall 16 and the externally exposed surfaces of the tubular peripheral sidewall of base 50. More specifically, it will be observed that upon heat shrinkage sleeve 60 shrinks into contour conforming engagement with reentrant portion 57 with the portion 66 of sleeve 60 immediately outwardly of ledge 58 proceeding inwardly and downwardly in heat shrunk engagement therewith, thus greatly facilitating the gripping, secure attachment of base 50 to bottle 10. It will also be observed in FIG. 2 that sleeve 60 upon heat shrinkage precludes entry of contaminants between base 50 and bottle 10 since it spans the upper terminus of base 50 and is heat shrunk against adjacent portions of the bottle and base, hence blocking any possible openings which would allow contaminant access.

Referring now to FIG. 4 like numerals designate like features as set forth previously. As will be seen in FIG. 4 peripheral sidewall 16 adjacent bottom 18 includes an inwardly offset sidewall portion 17. Additionally, the upper margin of ledge 58 of base 50 merges with an upper tubular peripheral sidewall portion 59 which is generally vertically upright and which telescopically contacts the offset sidewall portion 17 of bottle 10. Preferably the thickness of upper tubular peripheral sidewall portion 59 is approximately equal to the difference between the radius of offset portion 17 and the radius of the bottle sidewall immediately adjacently upward of offset portion 17. The procedure for forming the final package of FIG. 4 is generally the same as that indicated above, namely, bottle 10 is telescopically and loosely positioned within base 50, with the offset sidewall portion 17 being positioned inwardly of the upper tubular peripheral sidewall portion 59 of base 50 and sleeve label 60 is then encirclingly applied about and heat shrunk to bring it into snug, peripheral, heat shrunk engagement with externally exposed surfaces of base 50 and bottle 10. One of the advantages of the embodiment of FIG. 4 is that the external surface of the upper portion of tubular peripheral sidewall 59 is generally in vertical alignment, or flush, with the external surface of sidewall 16 immediately above the offset portion 17 and, hence, virtually no edges of the upper terminus of base 50 are present which edges could provide potential contacting points by which forces could be applied to dislodge the base 50 from bottle 10.

While the above sets forth the present invention it will of course be apparent that modification is possible which pursuant to the patent statutes and laws does not depart from the spirit and scope of the present invention.

I claim:

1. A method of producing a package having a bottle substantially solely securely attached to a bottle supporting base with a heat shrunk label, said method comprising:
    (a) extruding a tube of plastic, stretching said tube both radially and longitudinally to biaxially orient the tube, the extent of stretch and the degree of orientation being greater longitudinally than radially, forming a decorated sleeve blank from the tube, fabricating the blank into a tubular sleeve label in which that portion of the original stretched tube which was stretched longitudinally extends circumferentially of the tubular sleeve label,
    (b) loosely positioning an uprightly unstable bottle having a vertical axis and a continuously arcuate bottom on a bottle supporting base having a flat support bottom,
    (c) encircling externally exposed peripheral surfaces only of said bottle and base including the peripheral line of juncture therebetween within the heat shrinkable pre-decorated tubular sleeve label, said sleeve label having a high heat shrinkage in the circumferential direction of said label and a low heat shrinkage in the axial direction of said label,
    (d) securely and integrally attaching said base to said loosely positioned bottle with said sleeve label by heating said sleeve label for a time and at a temperature sufficient to peripherally shrink said sleeve label into snug, encircling engagement with said external peripheral surfaces and insufficient to axially shrink the label beyond the confines of said base so as to produce said package, said heating being insufficient to cause any substantial deformation of said bottle, while effecting minimal distortion of said tubular sleeve label axially of said bottle, so that the package is supported on a horizontal surface by the uncovered base support bottom depending beneath said label.

2. The method of claim 1 wherein a portion of said externally exposed surface of said base is a ledge.

3. The method of claim 1 wherein a portion of said externally exposed surface of said base is a reentrant portion.

4. The method of claim 1 wherein said heat shrinkable sleeve label includes an axial heat sealed overlapped seam.

5. The method of claim 1 wherein said sleeve label comprises a cellular thermoplastic polymer and has a density of about 6-40 pounds per cubic foot and a thickness of about 5-40 mils.

6. The method of claim 1 wherein said bottle is formed of a polymer comprising an ethylene glycol-terephthalic acid reaction product and said sleeve comprises a closed cellular polystyrene.

* * * * *